June 27, 1967    S. H. NORTON    3,327,322
ARTIFICIAL HEART POWERED BY A FLUID PRESSURE PUMP
MEANS SIMULATING THE ACTION OF THE HUMAN HEART
Filed July 27, 1964    7 Sheets-Sheet 2

INVENTOR.
Samuel H. Norton
BY
ATTORNEYS

June 27, 1967 S. H. NORTON 3,327,322
ARTIFICIAL HEART POWERED BY A FLUID PRESSURE PUMP
MEANS SIMULATING THE ACTION OF THE HUMAN HEART
Filed July 27, 1964 7 Sheets-Sheet 3

INVENTOR.
Samuel H. Norton
BY
ATTORNEYS

June 27, 1967  S. H. NORTON  3,327,322
ARTIFICIAL HEART POWERED BY A FLUID PRESSURE PUMP
MEANS SIMULATING THE ACTION OF THE HUMAN HEART
Filed July 27, 1964  7 Sheets-Sheet

INVENTOR.
Samuel H. Norton
BY
ATTORNEYS

# United States Patent Office 3,327,322
Patented June 27, 1967

3,327,322
ARTIFICIAL HEART POWERED BY A FLUID PRESSURE PUMP MEANS SIMULATING THE ACTION OF THE HUMAN HEART
Samuel H. Norton, University Heights, Ohio, assignor to TRW Inc., a corporation of Ohio
Filed July 27, 1964, Ser. No. 385,238
18 Claims. (Cl. 3—1)

ABSTRACT OF THE DISCLOSURE

A combination artificial heart and pumping means simulating the action of the human heart including a push-pull gas pump for driving a supply of control fluid in a closed circuit, thereby to control the filling and discharging of blood into a compartment corresponding to a heart ventricle as a function of the filling and discharge of a control biasing compartment, and means for maintaining the timing of the suction and compression strokes of the pumping means in proportion, about in the order of 2:1 i.e., one of the strokes corresponding to a systole and the other to a diastole.

---

This invention relates generally to pumping apparatus and more particularly to a so-called "artificial heart" and a pumping means wherein the suction and compression strokes corresponding to the diastolic and systolic cycles can be maintained in a predetermined proportion of duration and wherein the speed of operation can be selectively varied.

It is an object of this invention to provide an artificial heart to replace an animal or human heart.

Another object of the present invention is to provide a heart of small design and maximum capacity with means to automatically adjust for high or low atrial blood pressure without changing the operating fluid pressure or the volume of operating fluid required to actuate the heart.

It is a further object of the present invention to provide an artificial heart that will automatically adjust to pump blood in small or large quantities and which will quickly equalize the quantity of blood pumped to the body and the lungs after a change in atrial pressure.

Another object of the present invention is to provide a heart with two ventricles or pumping chambers combined in a single heart unit and which can be operated by a fluid such as air or gas under pressure furnished by means of a small tube or tubes.

Still another object of the present invention is to provide an artificial heart to which suitable valves can be attached duplicating the action of the pulmonary, aortic, tricuspid and mitral valves.

Yet another object of the present invention is to provide a heart with reinforced plastic outer casings that may be sucked inward by a small suction pressure or vacuum.

Another object of the present invention is to provide a heart with circular pumping diaphragms having reinforced or thickened center portions to maintain a flat center surface when the diaphragm is being forced by air pressure or suction.

Another object of the present invention is to provide an artificial heart that will not collapse the veins or the atrium during the suction stroke of the pump and which will assist the return of blood to the ventricles by the slight collapse of the outer flexible case during suction, the assistance to the return of the blood being equal to the resistance of the case to be sucked inwardly.

Although the principles of the present invention are of general application to any pumping apparatus, the pumping construction and the pumping methods disclosed herein are particularly useful in medical procedures for use as an artificial heart. Accordingly, to clarify the special advantages embodied in the structure of the present invention, it is useful to orient the features incorporated in the present invention to the corresponding components of the heart.

The heart is a muscular organ divided into four chambers and blood is brought into the heart by large veins with valves controlling the flow of blood through the various chambers. Arteries carry blood away from the heart. The upper chamber on each side of the heart is called an auricle and below each auricle is another chamber called a ventricle. The two ventricles pump the blood into the arteries with the right ventricle pumping blood only to the lungs and the left ventricle, pumping blood through the entire body.

Blood in the right auricle chamber enters the right ventricle chamber through a so-called tricuspid valve and is discharged on its way to the lungs through a semi-lunar valve. Oxygenated blood from the lungs passes from the left auricle into the left ventricle through the mitral valve and is discharged to the body through a second semi-lunar valve.

Because the right side of the heart takes blood from the body and pumps it to the lungs, while the left side of the heart collects blood from the lungs and pumps it to the body, the heart is really two pumps in one. The two sides of the heart, however, relax and fill and then contract and empty themselves at the same time. The relaxing and filling phase is called the diastole and the contracting and pumping phase is called the systole.

In accordance with the principles of the present invention, a casing means comprising a flat rigid member forming a common wall for two adjacent pumping chambers corresponding to the right and left ventricles of the heart is provided and a movable flexible diaphragm on each side of the common wall is connected to the casing means to form together with the common wall the two adjacent pumping chambers. There is further provided a biasing chamber for each ventricle and pumping means are connected to the biasing chambers to power the ventricles by alternately filling and emptying the biasing chambers or compartments.

The pumping apparatus of the present invention has particular utility in operating an artificial heart which has been replaced in an animal or in a human being. In the heart of a live animal or in a human, the suction or diastole phase of the pumping action takes approximately twice as much time as the pressure or systole phase. Further, it is alo desirable to adjust the volume of pumping fluid used in operating the artificial heart, per se, while the heart is in operation in the patient or user.

In an ordinary gas pump of the prior art, if the length of the crank is adjusted to change the length of the stroke, it will be necessary to shorten or lengthen the piston rod so that the piston will come close to the cylinder head at the end of the compression stroke. In accordance with the principles of the present invention, means are provided to automatically traverse the piston close to the cylinder head at the end of every compression stroke independent of the length of the piston travel. With the adjustment of the piston stroke length, if the piston is adjusted towards the cylinder head, pressure may be built up in the cylinder, or if it is adjusted away from the cylinder head, a negative pressure or vacuum could be created. To overcome that phenomena, there is further incorporated in the apparatus of the present invention a valve and a mechanism for operating the valve at the end of each suction stroke. Means are also provided in accordance with the principles of the present invention for changing the speed of the pump by using a variable speed motor or transmission which can be adjusted while the pump is running.

The artificial heart of the present invention, similar to a live heart in a human or an animal, is made with two ventricles which require different pressures but the same timing. It is contemplated by the present invention, therefore, to provide two cylinders or bellows, one for each ventricle. Since the pump is entirely inclosed and the operator does not know the duration of stroke he has effected by way of adjustment, an index graduation is provided affording a visual observation point.

In accordance with the principles of the present invention, a special mechanism is provided for transmitting the rotational movement of a shaft into reciprocating movement of a piston-type pump connected to each respective biasing compartment. The mechanism includes a rotatable crank having a crank pin driven through a fixed circular arc or circle and a rocking member having a slot which receives the crank pin. A pivot connection couples the rocking member to a reference support for oscillation of the rocking member and a crank arm interconnects the rocking member to the piston of the pump. The reference support is made adjustable, thereby permitting the pivot pin to be adjusted through a circumferentially extending circular adjustment path in order to vary the length of stroke of the piston so that the proportion of the strokes corresponding to the diastole and the systole phases of the heart action may be selectively varied in length of stroke from 0 to maximum and maintained in a fixed duration of approximately 2 to 1.

It is an object of the present invention, therefore, to provide an artificial heart and pumping apparatus characterized by means for adjusting and varying the length of the suction and compression strokes corresponding to the systole and diastole and wherein the 2 to 1 proportion is constant for any length of stroke.

Another object of the present invention is to provide means for adjusting the strokes in a piston-actuated artificial heart wherein the piston will always travel through the complete length of a stroke to the cylinder head, regardless of the length of either the suction stroke or the compression stroke.

A further object of the present invention is to provide means for venting the cylinders of a piston-type pump to the atmosphere at the end of each suction stroke in order to equalize the pressure or vacuum in the cylinders after adjusting the strokes corresponding to the desired systolic and diastolic heart action when the pump is used as a heart actuator.

A still further object of the present invention is to provide adjustment means affording a micrometer adjustment of the duration of the piston strokes in an artificial heart pump apparatus.

Yet another object of the present invention is to provide adjustable speed control means for selectively varying the action of an artificial heart apparatus.

A still further object of the present invention is to provide clamping means and calibration means whereby the length of the piston strokes in a piston pump actuated heart may be selectively adjusted and locked in such selected adjustment and wherein special calibrated means are provided for indicating the amount of adjustment with particular reference to the length of the strokes.

Yet another object of the present invention is to provide a simulated heart wherein the pumping action is effected by fluid biasing of a sack-like compartmented construction having compartments corresponding to the right and left ventricles of the heart.

Another object of the present invention is to provide means for quickly and conveniently attaching the heart to the arteries and veins of an animal or human.

Many other features, advantages and additional objects of the present invention will become manifest to those versed in the art upon making reference to the detailed description which follows and the accompanying sheets of drawings in which a preferred embodiment of an artificial heart and a pumping apparatus therefor is shown by way of illustrative example.

In the exemplary form of the pumping mechanism herein described by way of illustration of the principles of the present invention, there is provided two separate pumping units which are exactly alike except for the spiral gear drive, and accordingly, for the sake of clarity in description, only one side with its drive will be described and it will be understood that such descriptive matter refers to the pumping unit of the opposite side as well except for some features shown on the unsectioned part of the drawing which are not common to both pumping units. Thus, there is shown a first pumping unit $P_1$ and a second pumping unit indicated generally at $P_2$. Each pumping unit $P_1$ and $P_2$ incorporates a cylinder 11 externally threaded at one end as at 12 for screw-threaded connection to a circular frame 13. A cylinder head 14 is shown screw-threaded into the opposite end of the cylinder 11. A piston head is provided and is shown generally at 16. The piston head 16 consists of two parts including a body member 17 and a ring 18. The body member 17 and ring 18 clamp a pair of packing units indicated at 19 and 20, respectively, one of which is designed to hold suction and the other to hold pressure. A pair of nipples 21 and 22 are screw-threaded in firm assembly in the head member 14 of the cylinder 11 and cooperate with tubing-type conduit 23 and 24 to permit pumping medium to enter or leave the cylinder 11.

A piston rod 26 is connected in firm ansembly to the piston head 16 by means of a screw 27. The piston rod 26 is supported by upper and lower ways 28 and 29 which are integral with the circular frame 13.

Figures 13, 14, 16, 17:
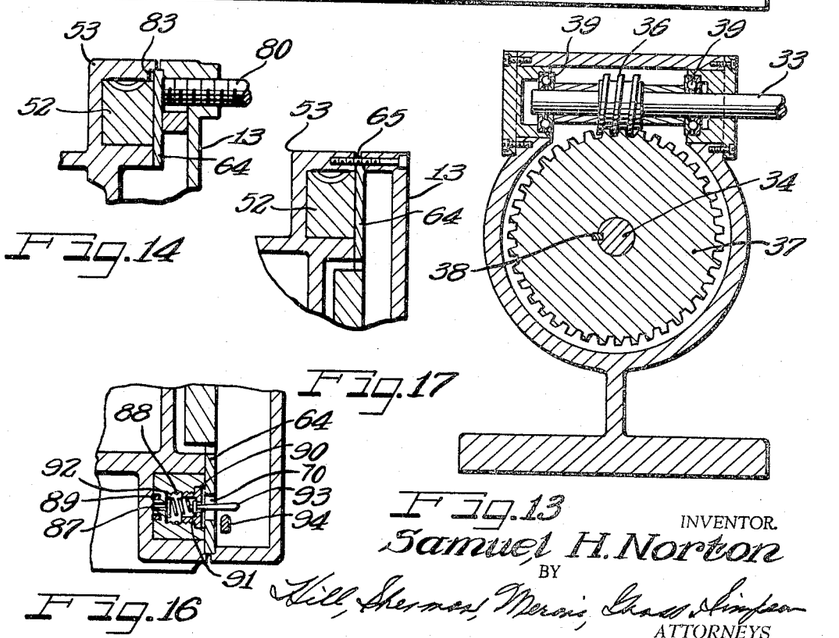
FIGURE 13 is a cross-sectional view taken through the driving gears on line XIII—XIII of FIGURE 12.
FIGURE 14 is a fragmentary cross-sectional view taken on line XIV—XIV of FIGURE 11 and illustrating additional detail of the means for clamping the variable stroke adjustment.
FIGURE 16 is a fragmentary cross-sectional view taken through the value which opens the cylinder to the atmosphere taken generally on line XVI—XVI of FIGURE 11.
FIGURE 17 is a fragmentary cross-sectional view taken generally on line XVII—XVII of FIGURE 11.

In order to provide power for operating the pumping mechanism, there is provided a motor shown generally at 30 and having a speed changing mechanism contained within a gear box 31 regulated by a control lever 32. Power is transmitted from a motor shaft 33 to a pump shaft 34 by means of a worm gear 36 co-rotatable with the shaft 33 and engaging a gear 37 keyed to the shaft 34 as at 38. As shown in FIGURE 13, the end of the shaft 33 is supported in bearings indicated at 39 carried within a housing portion of the circular frame 13. A thrust bearing shown at 40 (FIGURE 15) absorbs the thrust of the gear 37 and a bearing 41 absorbs the radial load of the shaft 34. It will be understood that a similar bearing arrangement not shown, is located in the housing of the other pumping unit $P_2$.

On the other side of the gear 37 there is provided a seal 42 which is used to retain lubricant in the gear housing portion of the circular frame 13, which housing is indicated generally at 43 for better identification.

In accordance with the principles of the present invention, a special mechanism is provided for transmitting the rotational movement of the shaft 34 into reciprocating movement of the piston rod 26 and the piston 16.

Thus, a crank 44 is co-rotatably connected to the shaft 34 by means of a key 46 and a nut 47.

A counterweight 48 (FIGURE 11) is carried by the crank 44 and counteracts the weight of the reciprocating parts. A cam roller 49 is attached to the crank arm 44 and operates in an elongated slot or camming slot 50 of a rocking arm 51.

A ring 52 is rotatably mounted in a housing designated at 43 comprising an integrant part of the circular frame 13 and is rotatably supported on a surface shown at 54. The ring 52 is particularly characterized by worm teeth 56 formed on the outer periphery thereof which cooperatively engage and register with a worm 57 carried on a shaft 58 which can be rotatably and adjustably driven by a manual adjustment knob 59. The shaft 58 is supported by brushings 60 and 61 which are locked in place by means of set screws 62 and 63.

Figure 12:
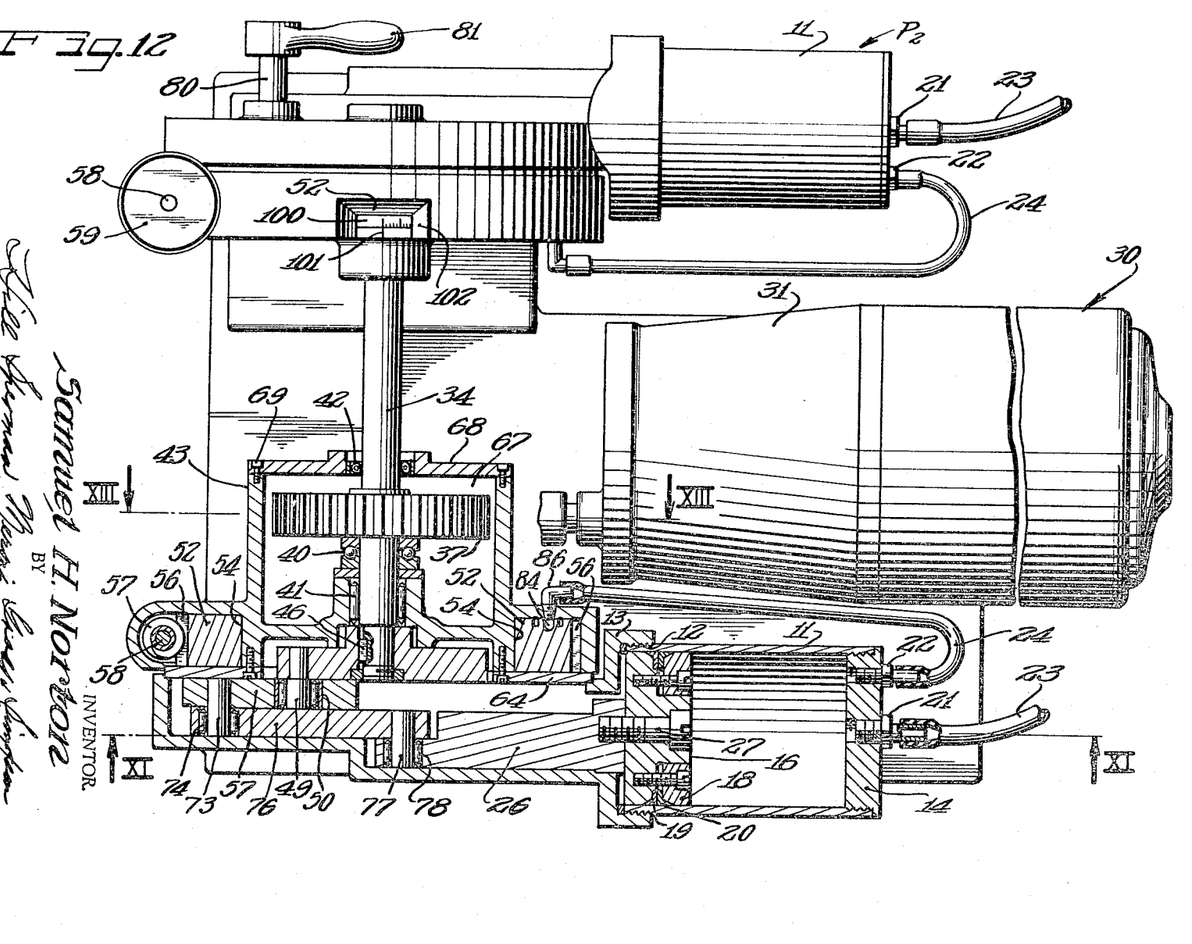
FIGURE 12 is a cross-sectional view taken through one of the pumping units in the plane of line XII—XII of FIGURE 11.

Upon rotation of the knob 59 and rotation of the ring 52, sliding contact is effected with a collar 64 which is clamped on its inner edge and on its outer edge by a plurality of screws which engage the adjoining parts such as the circular frame 13 (see FIGURES 12 and 17).

The housing portion 43 forms a grease chamber 67 for the gear 37 and is closed by a plate 68 retained by fastening screws 69.

The collar 64 has formed therein a circumferentially extending slot 70 and a trunnion pin 71 is fixed in the ring 52, and passes through the slot 70 in the collar 64 and through a bearing 72 carried at one end of the rocking arm 51 which may also be referred to sometimes herein as an oscillating bar 51. Thus, the rocking arm or oscillating bar 51 is pivotally supported for oscillation about an axis determined by the trunnion pin 71 and its bearing 72. Moreover, the member 51 will be oscillated upon rotation of the crank 44 and its associated cam roller 49.

A crank pin 73 is fixed in the rocking arm or oscillating bar 51 and projects into a bearing 74 carried by a connecting rod 76. The connecting rod 76 is attached at its opposite end to the piston rod 26 by means of a pin 77 received in a bearing 78. Thus, it will be appreciated that by turning the crank 44, the rocking arm or oscillating bar 51 will oscillate about the pin 71, whereupon the connecting rod 76 will transmit a reciprocating motion to the piston head 16 via the piston rod 26.

In order to lock the ring 52 and prevent creeping rotation of the same, a clamp screw is provided at 80 (FIGURE 11) which is turned by a lever 81 (FIGURE 12) and which presses a corresponding plate 64 tightly against the ring 52. Clearance is provided on one side of the plate 64 as at 83 (FIGURE 14). Clearance is provided at this one spot only.

A groove 84 (FIGURE 11) partially encircles the ring 52 and opens into a hole and fitting 86 (FIGURE 12). The fitting 86 is connected to the fitting 22 by the conduit 24 so that at all times, fluid in the cylinder 11 has free passage to the groove 84. The groove 84 terminates at a hole 87 (FIGURE 16) which, in turn, opens into a valve cavity 88. A long ring-type packing 89 entirely encases the groove 84 to provide a seal between it and the casing provided by the circular frame 43.

The valve body is shown at 90 and is screwed into the valve cavity 88. A movable valve member having a head 91 is normally biased closed by a spring 92 and has an axially projecting needle 93 which projects outwardly at right angles to the valve seat when the needle is not deflected by a cam arm 94 formed on the rocking arm or oscillating bar 51.

It will be noted that the valve stem or needle 93 extends through the slot 70 in the plate 64 and inasmuch as the ring 52 and the swinging arm or rocking arm 51 travel together when adjustment is made, they will always be in the same relation to one another.

Figure 11:
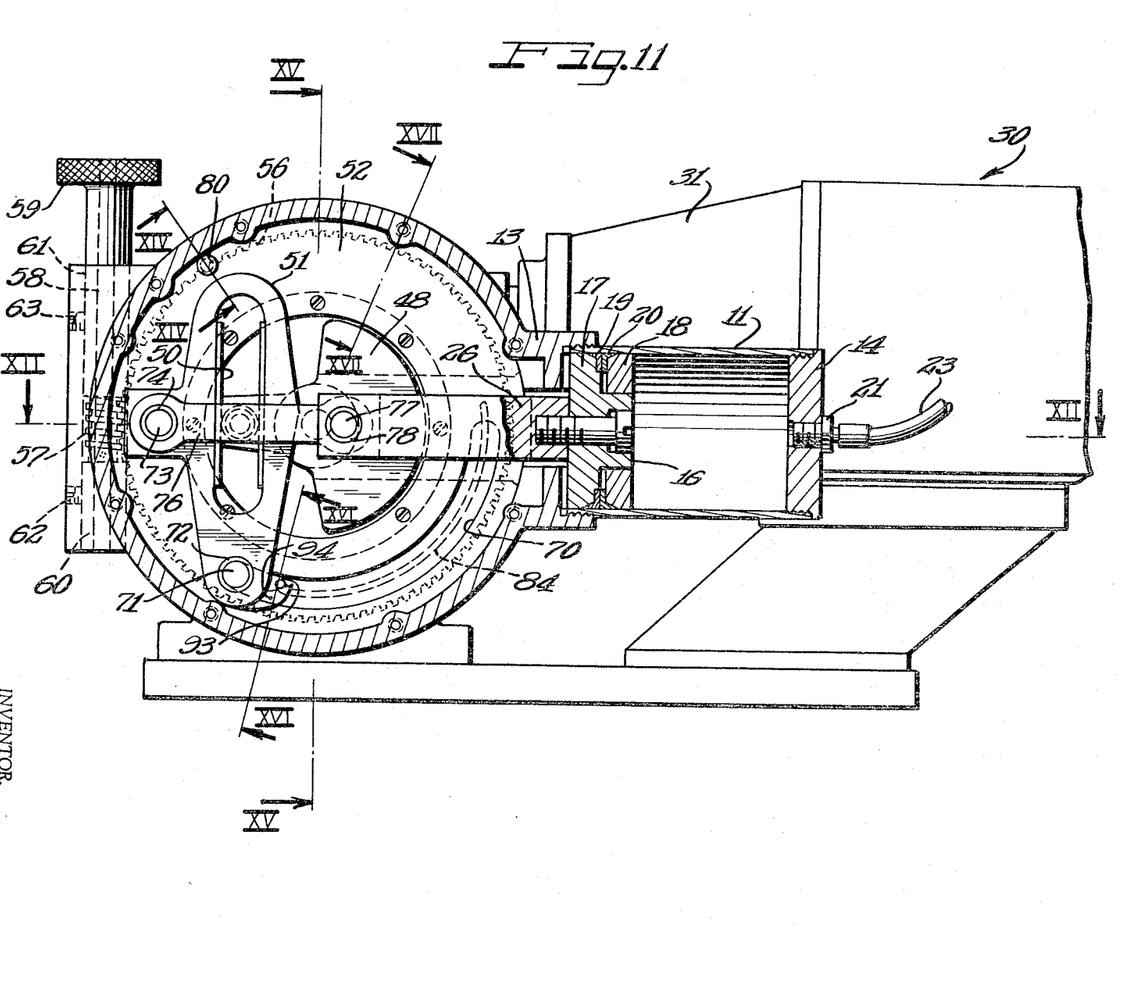
FIGURE 11 is a cross-sectional view of a pump provided in accordance with the principles of the present invention taken generally on line XI—XI of FIGURE 12.
Figure 15:
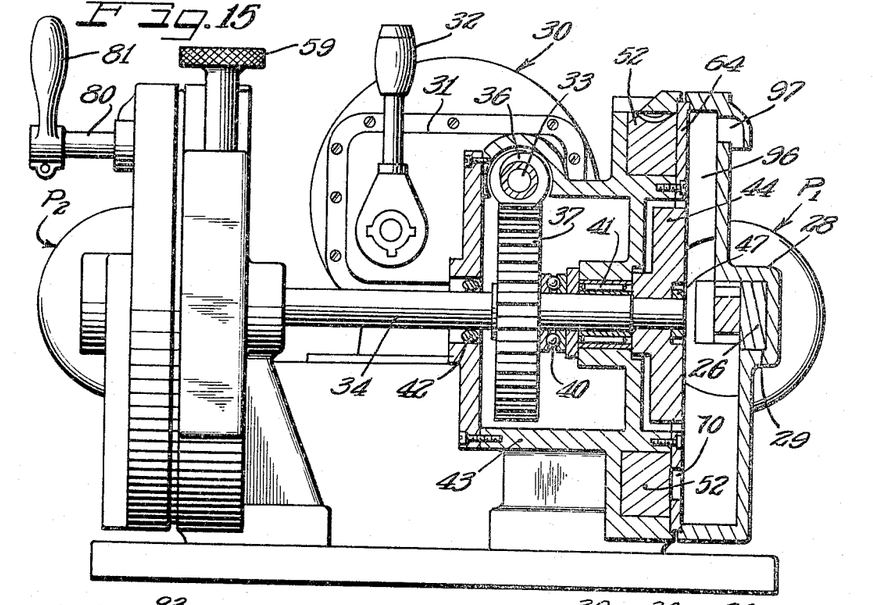
FIGURE 15 is an end elevational view but with parts shown in cross-section taken on line XV—XV of FIGURE 11.

In FIGURE 11, the rocking arm 51 is in its extreme left position and at this position the cam extension 94 on the rocking arm 51 is in contact with the valve stem 93 and has pushed the stem 93 sideways, thus tipping its head 91 on the seat opening a passage for fluid to escape into or from a passageway 96 and then to the atmosphere through a vent opening 97 (FIGURE 15). This will open the cylinder 11 to the atmosphere at the end of each suction stroke and will, therefore, equalize the pressure or vacuum in the cylinder 11 after each adjustment. At all other positions of the rocking arm or oscillating bar 51, the valve stem 93 will have its head 91 pressed against the valve seat by the spring 92, thus closing the valve and sealing the air passage 96 from the atmosphere. This is indicated in FIGURE 16.

The pumping mechanism thus far described embodies the structural requisites of obtaining length of stroke adjustment from a maximum to zero and yet the piston will nearly touch the cylinder head for any length stroke.

It may be desirable in some pumping applications and uses to provide a pressure stroke which takes approximately one half the time of the suction stroke.

Figure 18:
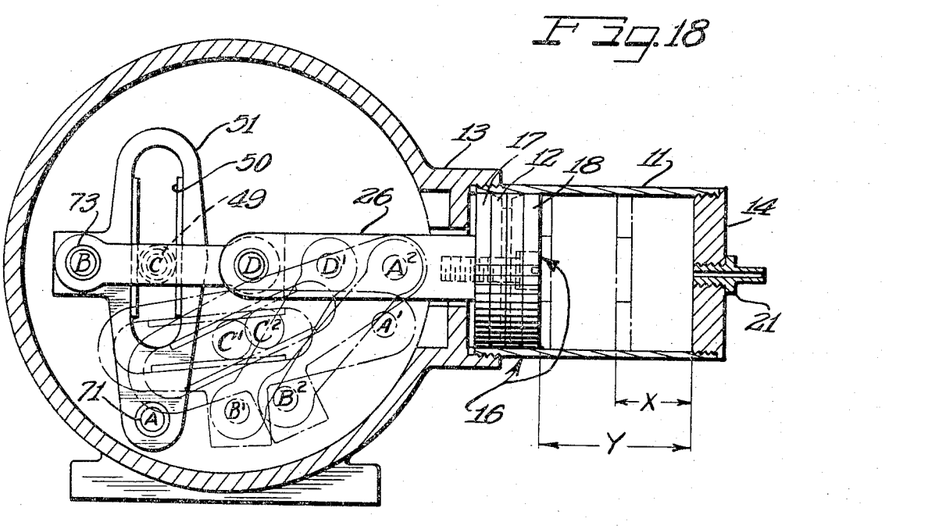
FIGURE 18 is a cross-section similar to FIGURE 11 but showing the oscillating mechanism and the various stroke settings therefor.
Figure 19:
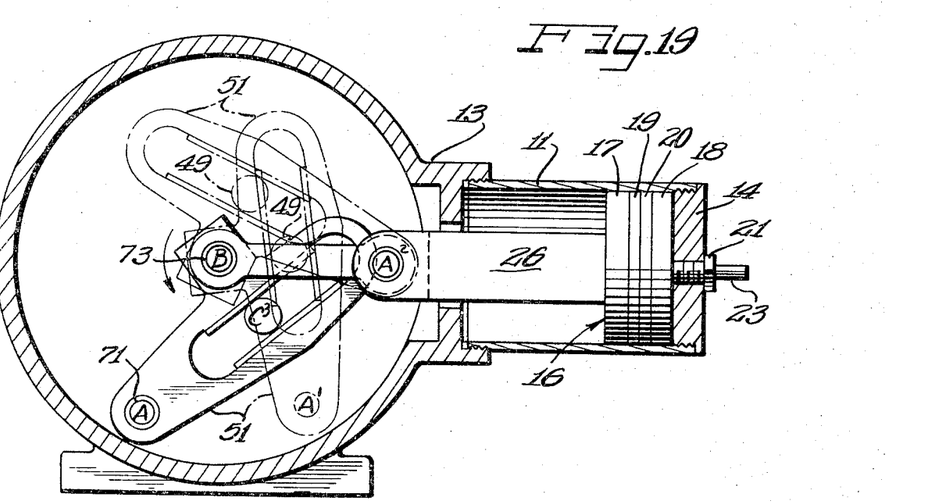
FIGURE 19 is a cross-sectional view similar to FIGURE 11 showing the piston against the cylinder head at the end of the compression stroke for strokes of three different durations.

Referring to FIGURES 18 and 19, point A represents the center of the pin 71 and point C represents the center of the cam roller 49. As the crank 44 is rotated by the shaft 34, the cam roller 49 travels in a fixed circular path and as it rolls in the slot 50 of the oscillating bar 51, it causes the bar 51 to travel from a point C in FIGURE 18 to a point C3 in FIGURE 19. In terms of angularity, the difference in travel of the cam roller 49 between FIGURE 18 and FIGURE 19 is approximately 120°. In the course of this angular traverse, the piston rod 26 and the piston 16 have moved only through the compression stroke, thereby establishing that the pressure stroke is approximately one-third as long as the suction stroke.

One of the characteristics of the present pumping mechanism is that no matter what the length of the piston stroke, the piston 16 always comes into near contact with the cylinder head 14. This is clearly illustrated in FIGURE 19. Here it will be observed that whatever adjustment is made by turning the knob 59 and thereby rotating the ring 52 and hence the trunnion pin 71 along the arc prescribed by the slot 70, the point prescribed by the pin 73 will always come to the same point at the end of the compression stroke. Point B is the center of rotation of the shaft 34 and the crank 44, as shown in FIGURE 19.

In order to depict separate settings of the point A, there is also shown in FIGURE 18 an adjustment of the point A to a point $A^1$ and $A^2$ of the trunnion pin 71. However, in each instance, the point B will stop at the center of rotation of the shaft 34, as shown in FIGURE 19.

Thus, the distance from point B to point $A^2$ is equal to the radius of the slot 70. Thus, at the setting of $A^2$, the connecting rod 76 will swing on the point $A^2$ along with the oscillating bar 51, thus causing no movement of the piston head 16 or zero compression. Now, if the point $A^2$, FIGURE 18, is adjusted back to point $A^1$, the piston will have a travel of X and if adjusted to give the maximum stroke or to point A, the piston 16 will have a stroke equal to Y.

In order that the operator may tell what setting or stroke has been obtained after making an adjustment by turning the knob 59, a graduated segment 100 is formed on the periphery of the ring 52 (FIGURE 12) and moves with the ring 52 to register with an index mark 101. A beveled cut 102 is made in the outer shell of the case 53 to increase the visibility of the graduations.

It will be appreciated that there has been described hereinabove an arrangement whereby the center line through the piston 16 and the cylinder 11 must pass through the center of the crankshaft and the connecting rod crank pin on the oscillating bar 51, when the piston 16 is at the extreme of the suction stroke. Moreover, the throw of the crank 44 is approximately equal to the desired travel of the piston 16 and the length of the connecting rod 76 is slightly greater than the throw of the crank 44.

The heart of the present invention is shown generally at H and comprises a rigid frame shown generally at 200 and comprising first and second cup-shaped enclosures 201 and 202 each characterized by upstanding side walls 203 and 204 and having a flat common bottom wall 205.

Figure 6:
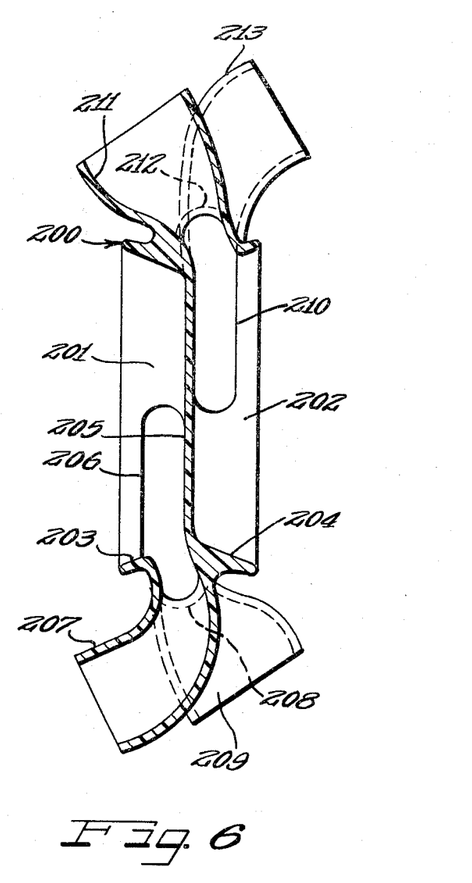
FIGURE 6 is a cross-sectional view taken in the plane of line III—III but illustrates additional details of construction of the main frame member of the artificial heart.

Referring specifically to FIGURE 6, it will be noted the side wall 203 has a port formed therein identified at 206. The port 206 communicates with an outwardly projecting conduit 207 adapted to be connected to a corresponding portion of the blood circulatory system, for example, in a human body. It will be understood that the side wall 203 is formed with another port shown at 208 in FIGURE 6 communicating with a conduit 209.

In like manner, the side wall 204 has a port 210 formed therein communicating with a conduit 211 and a second port 212 communicating with a conduit 213.

Figure 3:
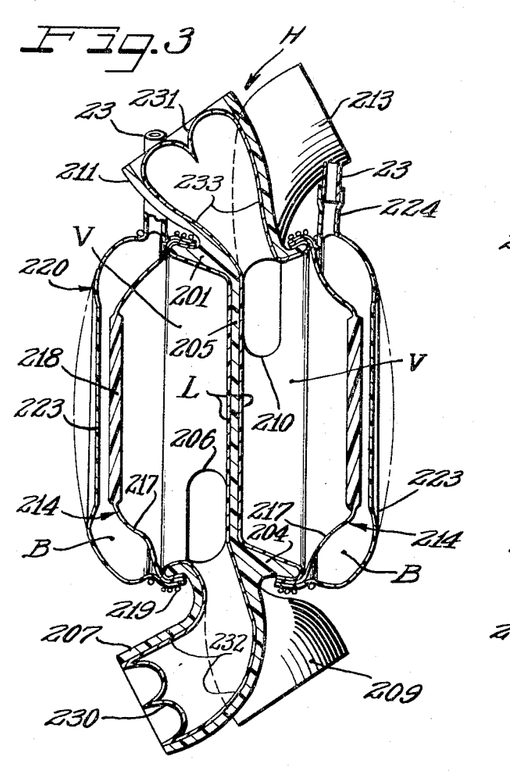
FIGURES 3, 4 and 5 are cross-sectional views taken generally on line III—III of FIGURE 2 and illustrating additional details of the heart construction provided in accordance with the principles of the present invention with the movable components thereof depicted at different positions corresponding to different portions of the operating cycle.
Figure 4:
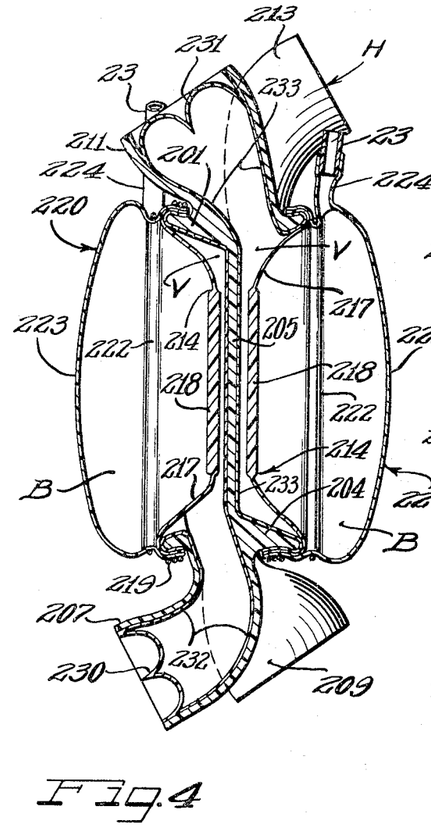
Figure 5:
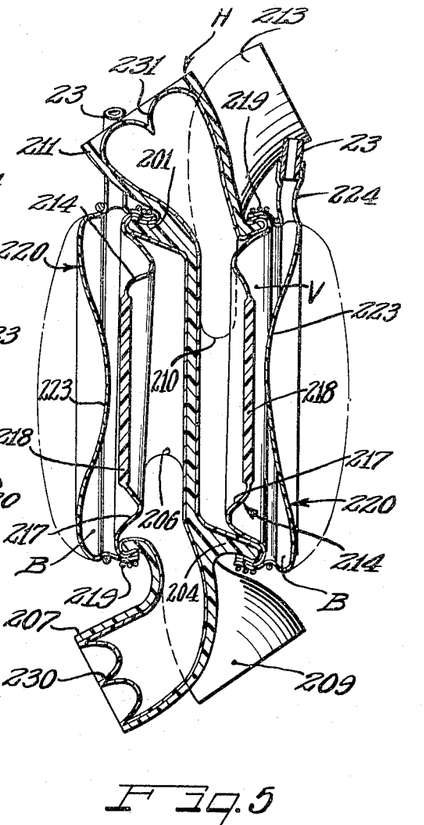

The rigid body member 200 may be conveniently made as a plastic molding or can be made of any other suitable rigid material such as metal and in order to render the entire working surfaces thereof chemically inert, a liner may be provided as shown at L in FIGURES 3, 4 and 5.

Figures 7, 8, 9, 10:
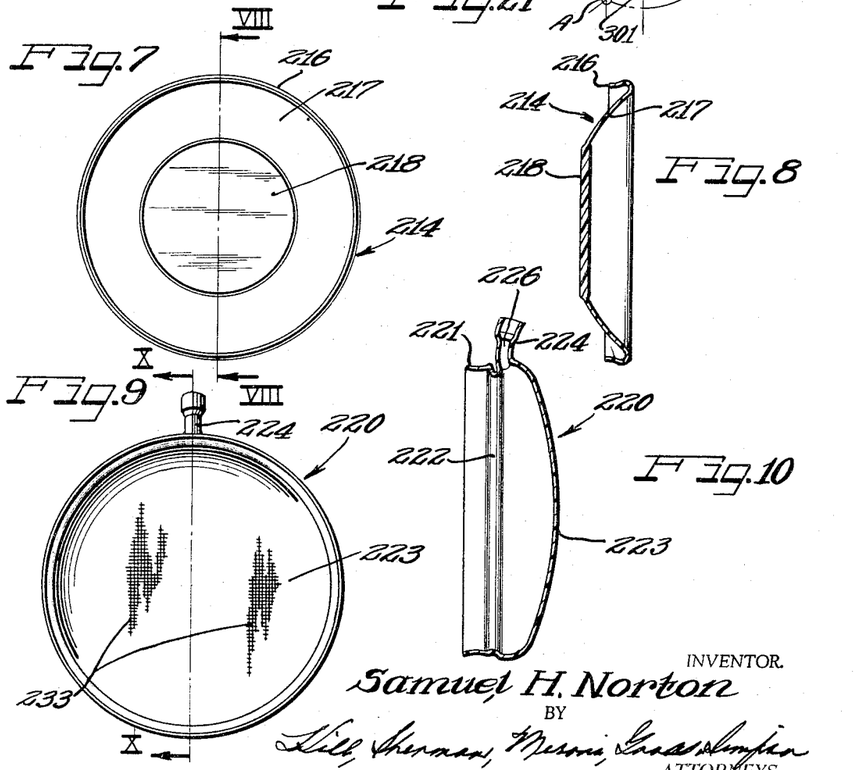
FIGURE 7 is an elevational view of a diaphragm member incorporated in the heart.
FIGURE 8 is a cross-sectional view taken on line VIII—VIII of FIGURE 7.
FIGURE 9 is an elevational view of a cover member provided in the heart of the present invention.
FIGURE 10 is a cross-sectional view taken on line X—X of FIGURE 9.

Referring now to FIGURES 7 and 8, it will be noted there is provided a diaphragm member which is generally annular in configuration and which is indicated generally at 214. The diaphragm member 214 has an outer peripheral edge 216 forming a reversely turned flange. There is then provided a thin flexible portion 217 which terminates in a thickened centrally disposed rigid disk 218 which is adapted to be spaced in generally parallel relation to the common wall 205 of the main body frame 200.

One of the diaphragm members 214 is clamped to each of the side wall portions 203 and 204 and is retained in firm assembly therewith by means of a retainer cord 219, thereby forming together with the corresponding side walls and the common wall 203, 204, 205 a pair of adjacent chambers corresponding to the right and left ventricles of the heart. Accordingly, the chambers are indicated generally at V.

Referring now to FIGURES 9 and 10, there is provided a cap or cover member shown generally at 220 and comprising a circumferentially extending flange 221 embossed as at 222 to form a circumferential groove and having a dome-shaped flexible annular wall 223 with an integral nipple projecting therefrom as at 224 and thereby providing a port 226. The nipple 224 is connected to a corresponding conduit 23 of one of the pumping units $P_1$ or $P_2$ and each corresponding cap or cover member 220 is secured in firm assembly to the main body or frame 200 of the heart outwardly of the diaphragm member 214 and is retained by the same cord means 219, thereby to form a biasing compartment shown at B for each corresponding ventricle V.

Figures 1, 21:
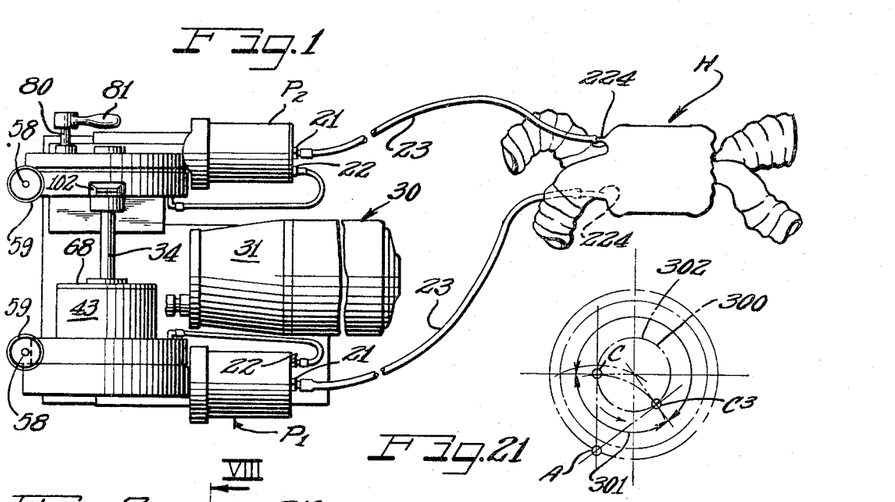
FIGURE 1 is a view of the artificial heart and pumping apparatus provided in accordance with the principles of the present invention.
FIGURE 21 is a diagrammatic illustration showing the proportion of the strokes in accordance with the principles of the present invention.
Figure 2:
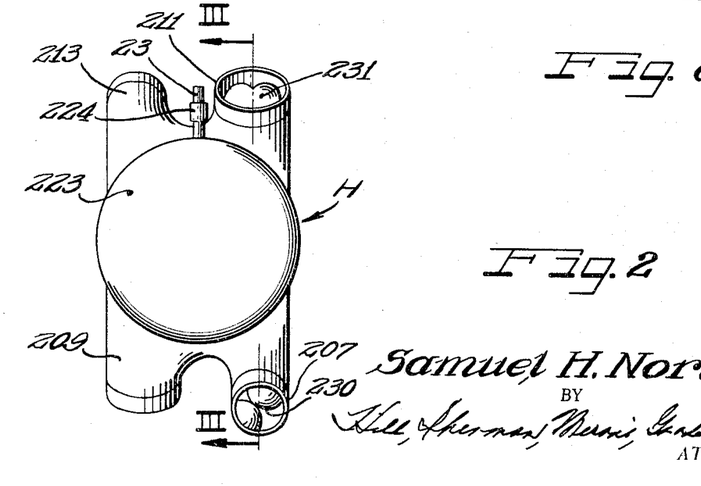
FIGURE 2 is a plan elevational view of the artificial heart provided in accordance with the principles of the present invention.

It has been noted previously that the diastolic phase of heart pumping action takes approximately twice as much time as the systolic phase. Referring to FIGURE 21 of the drawings, there is diagrammatically illustrated how such pumping action is accomplished in the pumping construction of the present invention. In FIGURE 21, the point A represents the center of the pin 71 and the point C represents the center of the cam roller 49. As the crank 44 is rotated by the shaft 34, the cam roller 49 travels in a circle indicated at 300 and as it rolls in the slot 50 of the rocking arm 51, it causes the arm 51 to travel from point C to point C3, which distance measured in terms of an arc, constitutes a first arc 301 which is approximately one-half as long as the outer arc 302 extending from point C3 to point C. Therefore, the pressure or systole stroke of the pump is approximately one-half as long the suction or diastole stroke.

The four openings provided for the heart H—207, 209, 211, 213—receive in inserted relation therewith suitable heart valves, representative ones of which are indicated in FIGURES 3, 4 and 5 at 230 and 231.

If desired, the cup-shaped outer casings 223 may be strengthened by a webbing reinforcing shown at 233 (FIGURE 9) which will allow the outer casings 220 to be sucked in but will hold the cases from being expanded beyond their normal working positions, as shown in FIGURE 4.

In operation, when there is a large quantity of blood coming back to the heart from the body and the lungs, the atrial pressure is up and when the quantity decreases, the atrial pressure goes down.

During times of great activity or excitement, the atrial pressure goes up and the heart receives and pumps more blood. During repose or reduced activity, such as sleeping, the atrial pressure goes down and the heart receives and pumps smaller amounts of blood. The human or the animal heart will quickly take care of any changes in atrial pressure by the action of the nerves and the muscles of the heart. In all artificial hearts provided heretofore, there has been no way incorporated in such prior art hearts for taking care of such changes in atrial pressure except to speed up the stroking of the heart. However, such operation can only be adjusted by watching a blood pressure chart and cannot be anticipated with any degree of accuracy. Another difficulty with artificial hearts heretofore provided resides in the difficulty of an operator attempting to equalize the pressure in the two ventricles. If the pressure in one ventricle is greater than in the other, it will force more blood to the lungs or to the body, thus killing the patient or the animal by smothering the user.

In accordance with the principles of the present invention, such difficulties of prior art artificial hearts are overcome automatically since the present invention is based on the premise that the human or animal heart can pump only what blood comes back to it from the body or the lungs. If more blood comes back, the heart will pump more, but if less, it will pump a lesser volume.

FIGURE 4 of the drawings shows the heart during the pressure stroke of the pump wherein the outer casings 220, 220 are forced outward to their fullest capacity and the pumping diaphragms 214, 214 are forced inwardly, thereby forcing blood out of the ventricles V, V. That action, as depicted in FIGURE 4 is called the systole.

During the suction stroke, the diaphragms 214, 214 are forced outwardly by the atrial or returning pressure of the blood. The pumping diaphragms 214, 214 continue outwardly until all of the blood stored in the atrium, right and left, has flowed into the heart cavities. This filling of the heart is helped somewhat by the suction caused by the pumping fluid which, in this instance, is air, being drawn back into the corresponding pump $P_1$ or $P_2$. The slight stiffness of the outer casings 220, 220 also helps. When all of the blood available has flowed into the two cavities V, V, the continued suction of the air will pull in the outer casings 220, 220 to make up for the short volume of blood, or the quantity of blood that would be required to completely fill the heart. This is depicted in FIGURE 3 and in FIGURE 5, each showing different quantities of filling.

FIGURE 5 shows filling or diastole with low atrial pressure and FIGURE 3 shows filling or diastole with high atrial pressure. Thus, it can be seen that the flexibility of the outer casings 220, 220, compensate for greater or less atrial pressure and the artificial heart H of the present invention will continue to work no matter what the atrial pressure, always pumping out whatever blood comes back to it.

The flexibility of the outer casings 220, 220 which allows each ventricle V, V to pump whatever blood comes back to it, will make it possible for the ventricles V, V to quickly equalize any difference in pressure or volume that may exist between them.

For instance, suppose the body sends back an increased amount of blood. This blood will all go into the right ventricle which will pump it all to the lungs. It will then return from the lungs in the same quantity to the left ventricle where it is pumped back to the body and the two ventricles have equalized their pressures and quantities because they will each continue to pump this larger amount of blood. This condition is depicted in FIGURE 3. If the body holds back blood from the right ventricle, as the patient assumes a position of rest, the same equalizing effect will result and the heart will continue to pump smaller amounts of blood.

It will be appreciated, therefore, that the biasing chambers or compartments provided by the outer sack-like constructions on the heart of the present invention not only develop a biasing function for operating the pumping action in the ventricle chambers, but function as compensating sacks.

Figure 20:
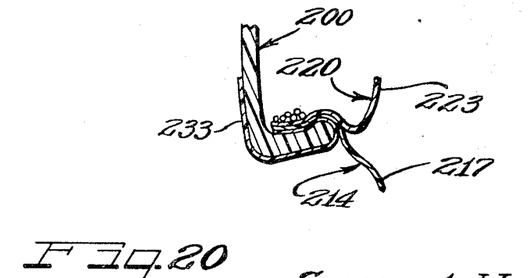
FIGURE 20 is a fragmentary cross-sectional view illustrating additional details of the coupling connection between components of the artificial heart.

The inner walls of the hard casing of the heart H are lined with a plastic material that is not affected by the blood. This material is indicated as 232 on the left chamber and 233 on the right chamber (FIGURES 4, 5, and 20). This material forms a medium to which the valves 231 and 230 shown, and two other valves not shown, are attached. It also serves as material by which the heart tubes are attached to the veins and arteries. FIGURE 20 shows how this plastic covering 233 is clamped along with the diaphragm 217 and outer case 223 to the hard frame 200.

It is possible to sew or suture the veins because of thin low pressure and clamp the arteries because of their high pressure to the valve and lining material 232 and 233.

A particular feature of the heart pump herein disclosed is that the piston 16 will nearly contact the cylinder head 14 for all lengths of stroke. This is necessary to insure positive and consistent action of the artificial heart H inasmuch as the pump is designed to handle a compressible fluid, namely, a gas or air. The importance of this feature increases directly as the length of stroke is decreased from the maximum. For example, if the piston did not move to the cylinder head at the end of the stroke, for very short strokes the action of the pump would be merely to compress and expand air in the cylinder rather than to deliver air to the pump.

This feature is specifically accomplished herein by the particular arrangement of crank, rocking arm, and connecting rod.

Although minor modifications might be suggested by those versed in the art, it should be understood that I wish to embody within the scope of the patent warranted hereon all such modifications as reasonably and properly come within the scope of my contribution to the art.

I claim as my invention:

1. A combination artificial heart and pumping means comprising
    casing means comprising a flat rigid member forming a common wall for two adjacent pumping chambers corresponding to the right and left ventricles of the human heart, inlet and outlet conduit means having valves therein for each said ventricle,
    a movable flexible diaphragm on each side of said common wall and connected to said casing means to form together with said common wall said two adjacent pumping chambers,
    a pair of cover members each cooperating with a corresponding one of said diaphragms to form a collapsible compartment,
    and pumping means connected to said collapsible compartments to power said pumping chambers by alternately filling and emptying said compartments.

2. A combination artificial heart and pumping means as defined in claim 1,
    said rigid member having a liner of flexible inert sheet material which is not effected by blood and forming a medium by which the heart may be attached to veins and arteries.

3. A combination artificial heart and pump comprising
    an integral rigid body member having oppositely disposed cup-shaped chambers each having circumferentially extending ported side walls and having a common flat bottom wall and circumferentially spaced outwardly projecting conduit necks forming an inlet and an outlet for each respective chamber,
    first and second flexible wall members connected to said side walls of each respective chamber,
        each said first flexible wall member having a thickened centrally disposed flat portion spaced parallel to said common wall and together therewith and with said side walls forming a pumping chamber corresponding to the right and left ventricles of the human heart, each said second flexible wall member being disposed outwardly of said first flexible wall member and having a port formed therein,
    thereby to form a biasing compartment for each of said ventricles,
    valve means in each said inlet and outlet for controlling the flow of blood through said ventricles,
    and a reciprocating pump connected to each said port of said biasing compartments,
    whereby reciprocation of said pump will simulate the action of the heart.

4. A combination artificial heart and pump as defined in claim 3 and further characterized by said pump having a cylinder and a piston reciprocable therein, and means for reciprocatingly driving said piston through a cycle including suction and compression strokes including timing means to maintain the duration of said strokes in the proportion of from about in the order of 2:1 thereby to simulate the systolic and diastolic phases of the heart.

5. A combination pump and artificial heart comprising first and second pumping units each comprising, a circular frame,
a shaft rotatably driven in said frame,
a crank connected to said shaft and rotated thereby,
a rocking arm having an elongated slot formed therein,
a cam roller interconnecting said crank and said rocking arm at said slot,
an angularly adjustable ring concentrically outwardly of said shaft and supported by said frame,
a trunnion pin carried by said ring and pivotally connected to said rocking arm, a cylinder,
a piston reciprocable in said cylinder,
a connecting rod connected to said piston and to said rocking arm,
an artificial heart comprising plural flexible compartments including two compartments corresponding to the right and left ventricles of the heart and two biasing compartments for filling and discharging said ventricles, inlet and outlet conduit means for each said ventricle and having valves therein and conduit means connecting each said respective biasing compartment to a corresponding cylinder of said pumping units, whereby rotation of said shaft will rotate said crank thereby oscillating said rocking arm and reciprocating the pistons through a suction and a compression stroke, the timing proportion of said strokes being adjustable by adjusting said ring in said frame thereby adjustably positioning said trunnion pin and changing the location of the pivot axis of said rocking arm.

6. A combination pump and an artificial heart comprising a rigid center frame having plural flexible outer biasing compartments connected thereto on opposite sides to form biasing compartments on the outermost portion of the heart and ventricle compartments inwardly thereof separated from one another by a common wall, said frame having two openings formed therein for each ventricle forming an inlet and an outlet for each said ventricle and means for connecting said openings to the body of a user,
value means in each said inlet and outlet for controlling flow of blood through the ventricles and pumping means connected to the outermost casing to supply said biasing compartments with pumping fluid.

7. A combination pump and artificial heart as defined in claim 6, said plural outer casings including a pumping diaphragm having a reinforced center section to remain flat when the diaphragm is subjected to pressure variations.

8. A combination pump and artificial heart as defined in claim 7, the outermost of said outer casings comprising a reinforced flexible material yieldable inwardly in response to normal suction forces of the heart, thereby assisting the return of blood to the ventricles.

9. An artificial heart comprising, a rigid frame having a common wall and including side walls on opposite sides of said common wall and forming together therewith two conical chambers,
said side walls having two ports formed therein for each respective chamber,
heart valves in said ports,
a pumping diaphragm for each chamber comprising a thickened stiff center portion and a thinner flexible outer portion overlying a corresponding one of said side walls, thereby closing the chamber to form a ventricle, a cup-shaped cover member made of flexible material and arranged outwardly of each said pumping diaphragm,
each said cover having a peripheral flange overlying one of said side walls and having means for receiving a biasing pressure therein from a source of increased pressure,
and a cord means tightly fastening said covers and said pumping diaphragms to said frame, thereby to form said heart.

10. An artificial heart as defined in claim 9,
said cover being reinforced but being flexibly yieldable to adjust for varying volumes of fluid in said heart.

11. In a combination pump and artificial heart,
an air pump of the push-pull type,
and flexible casing means forming an outer case and an inner compartment,
and a movable pumping diaphragm separating said outer case and said inner compartment, inlet and outlet conduits connected to said inner compartment and having valves therein,
conduit means interconnecting said pump and said outer case, whereby during the pressure stroke of the pump the outer case will be forced outward to its fullest capacity, thereby forcing the pumping diaphragm to pump blood out of said inner compartment, and during the suction stroke, the pumping diaphragm will be forced outward by atrial pressure until the blood has flowed into the inner compartment, continued suction of said pump having the effect of pulling in the flexible casing means to automatically make up for a short volume of blood.

12. In a combination pump and artificial heart,
flexible casing means forming first and second outer cases and corresponding inner compartments, inlet and outlet conduits for each said inner compartment and having valves therein,
and a movable pumping diaphragm separating each said outer case and a corresponding one of said inner compartments,
an air pump of the push-pull type of each outer case, conduit means interconnecting each said pump and a corresponding one of said outer cases, whereby during the pressure stroke of the pump the outer case will be forced outward to its fullest capacity, thereby forcing the pumping diaphragm to pump blood out of said inner compartment, and during suction stroke the pumping diaphragm will be forced outward by atrial pressure until the blood has flowed into the inner compartment, continued suction of said pumps having the effect of pulling in the flexible casing means to automatically make up for short volume of blood.

13. A combination pump and artificial heart for pumping blood which includes
means forming a closed control fluid circuit,
a push-pull gas pump for driving a supply of control fluid in said first closed circuit,
flexible casing means at one point in said first closed circuit for confining the fluid but being flexibly responsive to changes in volume as a function of the pushing and pulling action of the fluid in the circuit,
and means for paralleling a blood circulatory circuit with said first circuit comprising a flexibly responsive casing forming a chamber having a common wall with said flexibly responsive casing in said first closed circuit., and means forming valve controlled conduits communicating with said chamber, whereby whatever blood is received in said chamber will be pumped, the flexibility of the casing means equalizing any difference in pressure or volume that may exist.

14. A combination pump and artificial heart as defined in claim 13 wherein said gas pump comprises, a piston and a cylinder therefor relatively reciprocable to develop a push-pull pumping action, and means to drive said piston comprising a
rotary motor and a driving connection between said motor and said piston
having a
crank rotated by said motor,
a connecting rod connected to said piston and an adjustably pivotally mounted rocking arm interconnecting said crank and said rod to nearly contact the piston against the head end of the cylinder for all lengths of stroke, thereby insuring positive and consistent action of an artificial heart powered thereby.

15. A combination pump and artificial heart comprising flexible casing means forming first and second outer compartments and corresponding inner chambers,
said inner chambers corresponding to heart ventricles and having inlet and outlet conduit means for each ventricle with valves therein, a movable pumping diaphragm separating each outer compartment and said corresponding ventricle, and a reciprocable pump connected to each outer compartment comprising,
a cylinder,
a piston reciprocable therein and having a piston rod extending out of one end of said cylinder,
a connecting rod pivotally connected at one end to said piston rod,
a rocking arm having a connecting rod crank pin connected to the other end of said connecting rod,
means pivotally supporting said rocking arm for oscillation,
said rocking arm having a slot formed therein,
and a rotatable crankshaft having a crank pin in said slot to oscillate said arm and reciprocate said piston,
the center line through said piston and cylinder passing through the center of said crankshaft and said connecting rod crank pin when said piston is at one extreme end of its stroke,
conduit means interconnecting each said pump and a corresponding one of said compartments, whereby during the pressure stroke of the pump the outer case means will be forced outward to its fullest capacity, thereby forcing the pumping diaphragm to pump blood out of the adjacent ventricle, and during suction stroke the pumping diaphragm will be forced outward by atrial pressure until the blood has flowed in the ventricle, continued suction of said pump having the effect of pulling in the flexible casing means to automatically make up for short volume of blood.

16. A combination pump and artificial heart as defined in claim 15, which is further characterized by said means pivotally supporting said rocking arm comprising a frame,
a ring mounted for angular adjustment in said frame,
a pivot pin on said ring forming said means for pivotally supporting said rocking arm for oscillation,
and means for adjusting said ring, thereby to vary selectively the position of the pivot axis of said rocking arm for selectively varying the length of the suction stroke and compression stroke and hence varying the volume of the systolic and diastolic phases of the heart pumping action.

17. A combination pump and artificial heart as defined in claim 16, said pin on said ring being located on a circle with a radius equal to the length of the connecting rod and the center of the circle corresponding to the center of the crankshaft.

18. A combination pump and artificial heart as defined in claim 15, and a valve controlled passage for venting said cylinder,
said rocking arm having a valve actuator thereon for controlling said valve controlled passage at the end of each suction stroke in order to equalize the pressure in the cylinder after adjusting the strokes.

References Cited

UNITED STATES PATENTS

| | | | |
|---|---|---|---|
| 2,954,738 | 10/1960 | Di Vette | 103—44 |
| 2,972,894 | 2/1961 | Bennett | 103—38 X |
| 3,182,335 | 5/1965 | Bolie | 3—1 |

OTHER REFERENCES

"Artificial Intracorporeal Heart," by F. W. Hastings et al., Transactions of The American Society of Artificial Internal Organs, vol. 7, 1961, pp. 323–325.

"Artificial Heart With Anti-Vacuum Bellows," by S. Harry Norton et al., Transactions of The American Society of Artificial Internal Organs, vol. VIII, April 1962, pp. 131–134.

"Artificial Heart Incorporated in the Chest," by K. Atsumi et al., Transactions of The American Society of Artificial Internal Organs, vol. IX, April 1963, pp. 292–298.

RICHARD A. GAUDET, *Primary Examiner.*

R. L. FRINKS, *Assistant Examiner.*